United States Patent
Kim

(10) Patent No.: US 6,392,837 B1
(45) Date of Patent: May 21, 2002

(54) TECHNIQUE FOR OPENING DOOR OF A TAPE CARTRIDGE TO ACCESS THE TAPE LEADER PIN

(75) Inventor: William B. Kim, La Habra, CA (US)

(73) Assignee: Seagate Removable Storage Solutions LLC, Scotts Valley, CA (US)

(*) Notice: Subject to any disclaimer, the term of this patent is extended or adjusted under 35 U.S.C. 154(b) by 0 days.

(21) Appl. No.: 09/387,554

(22) Filed: Sep. 1, 1999

Related U.S. Application Data

(60) Provisional application No. 60/136,700, filed on May 28, 1999.

(51) Int. Cl.[7] ............................................. G11B 15/675
(52) U.S. Cl. ...................................................... 360/96.5
(58) Field of Search .......................... 360/93, 96.5, 95

(56) References Cited

U.S. PATENT DOCUMENTS

| | | |
|---|---|---|
| 3,932,891 A | 1/1976 | Horvath |
| 4,556,923 A | 12/1985 | Olmsted |
| 4,635,147 A * | 1/1987 | Durand et al. ............... 360/93 |
| 5,237,469 A | 8/1993 | Kukreja et al. |
| 5,331,485 A | 7/1994 | Bryer |
| 5,371,642 A | 12/1994 | Bryer |
| 5,495,374 A | 2/1996 | Hiscox et al. |
| 5,543,993 A | 8/1996 | Argumedo et al. |
| 5,652,683 A | 7/1997 | Bryer |
| 5,660,345 A | 8/1997 | Buckland et al. |
| 5,868,333 A | 2/1999 | Nayak |
| 5,890,669 A | 4/1999 | Buckland et al. |
| 6,069,765 A * | 5/2000 | Wada ........................ 360/96.5 |

OTHER PUBLICATIONS

"Linear Tape–Open (LTO) Technology", copyright by Hewlett–Packard, IBM and Seagate, reprinted from http://www.seagate.com/corp/ver/literature/papers/lto.shtppl.

* cited by examiner

*Primary Examiner*—Robert S. Tupper
(74) *Attorney, Agent, or Firm*—McDermott, Will & Emery

(57) ABSTRACT

An automatic tape cartridge loader includes a moveable shuttle, for receiving the tape cartridge, and elements for automatically actuating the shuttle during loading and unloading operations. The shuttle includes a door-opening feature, preferably formed as an integral element of one wall of the shuttle. The door-opening feature engages a sliding tape access door on one side of a tape cartridge, as the cartridge is inserted into the shuttle. The preferred embodiment of the shuttle also includes one or more extruded features formed on an opposite wall of the shuttle to justify the cartridge within the shuttle and thereby ensure engagement of the door-opening feature with the access door during cartridge insertion. These features are passive elements, in that they require no mechanical or electrical actuation or any parts that are moveable relative to the shuttle. Instead, these elements rely entirely on the movement of the cartridge into the shuttle to open the access door. The use of integral features to properly position the cartridge and open the door provides a particularly simple mechanism occupying minimal space within the volume allotted for the automatic cartridge loader mechanism. Also, these simple elements are quite durable and resistant to damage.

3 Claims, 10 Drawing Sheets

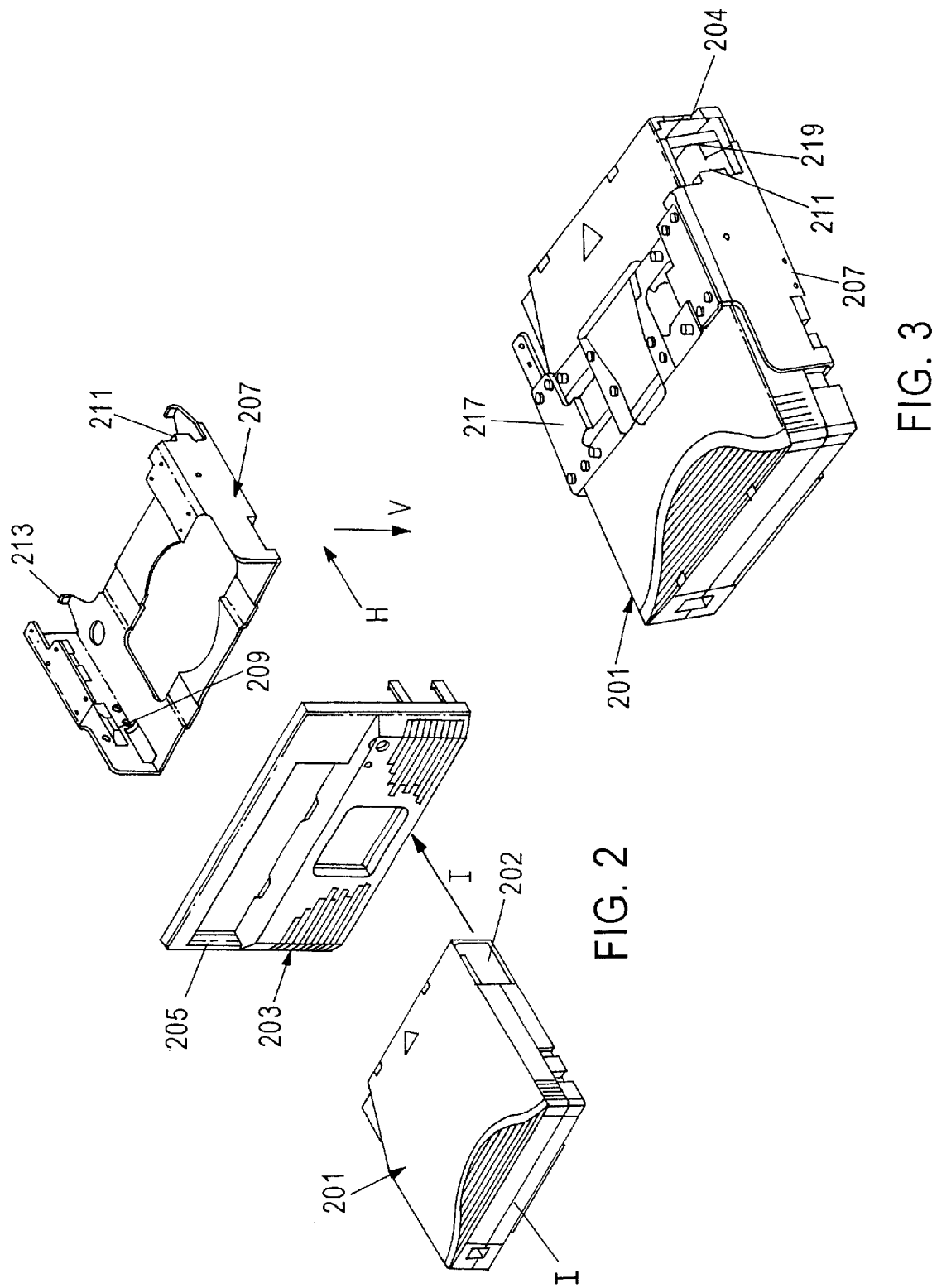

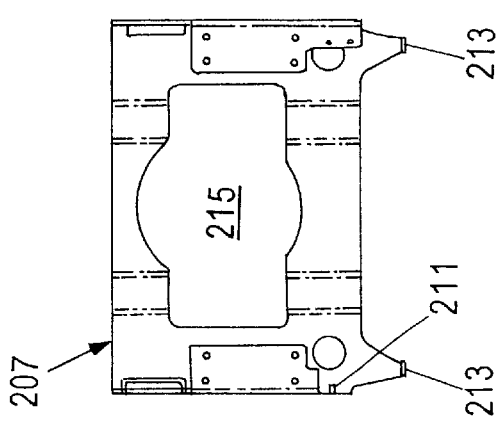
FIG 4-B
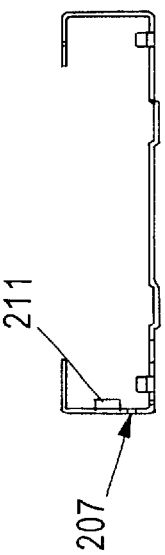
FIG. 4-C
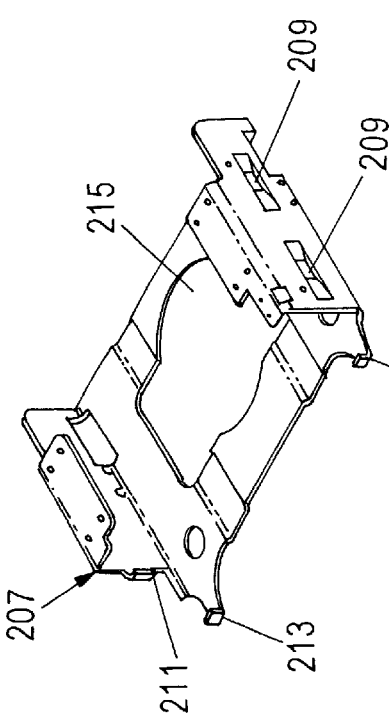
FIG. 4-A
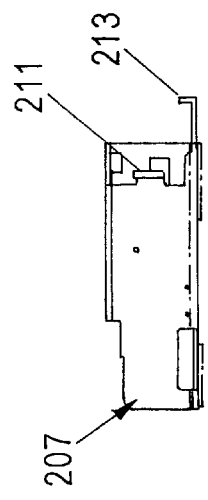
FIG. 4-D

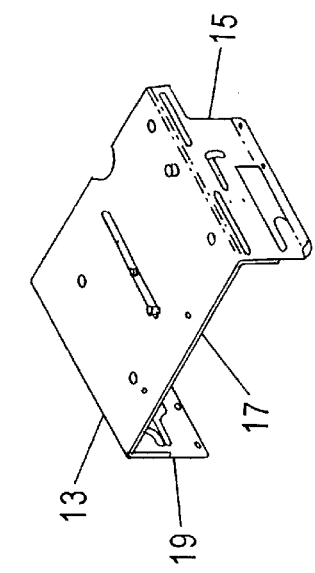
FIG. 5-A
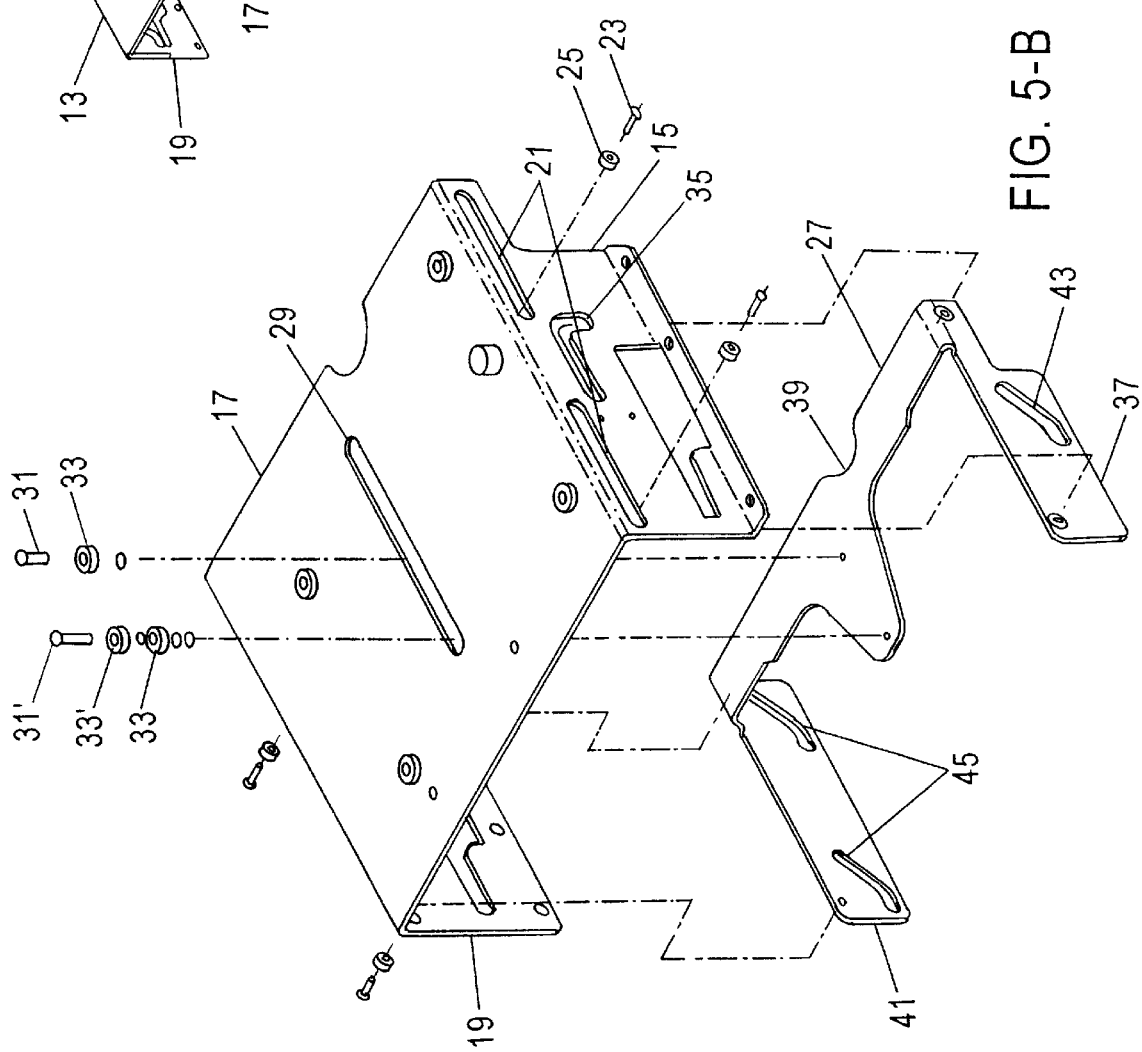
FIG. 5-B

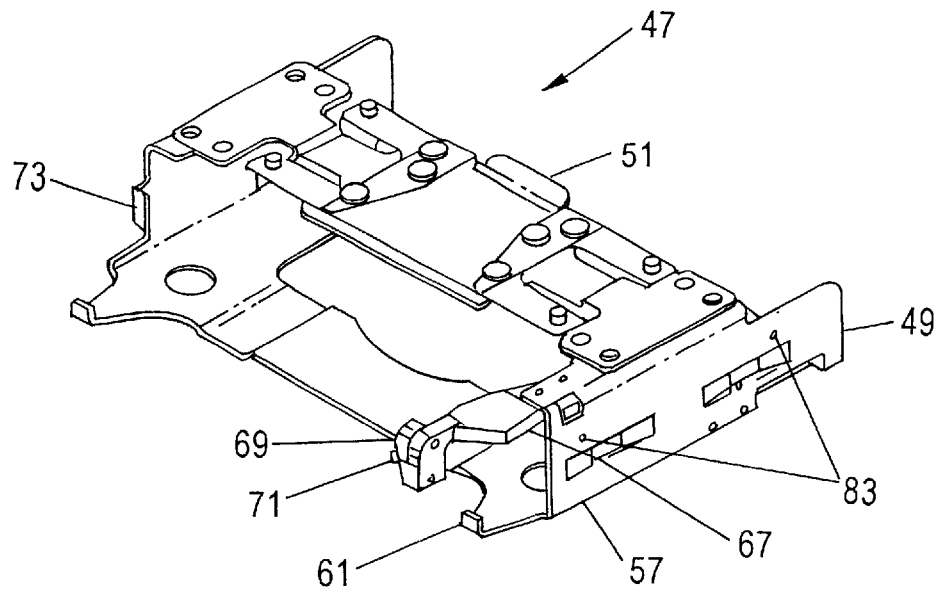
FIG. 6-A
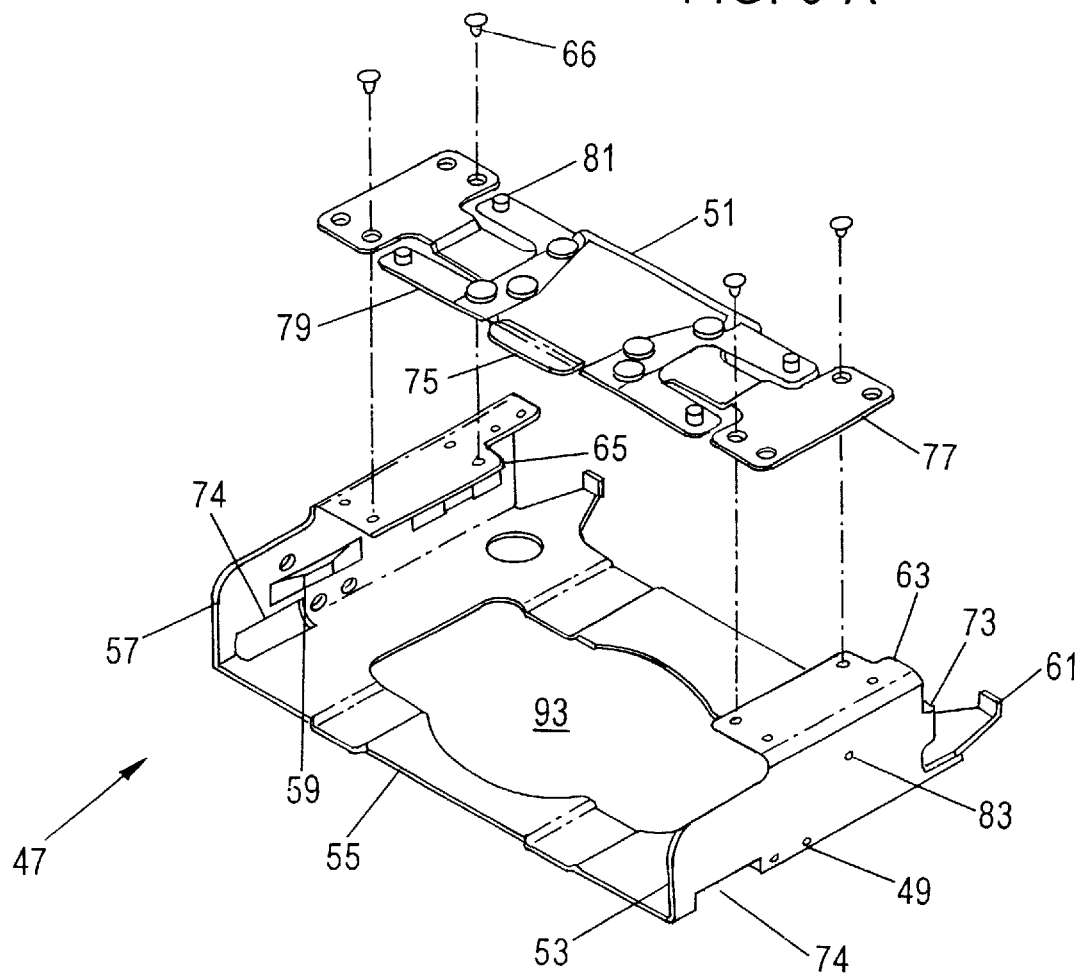
FIG. 6-B

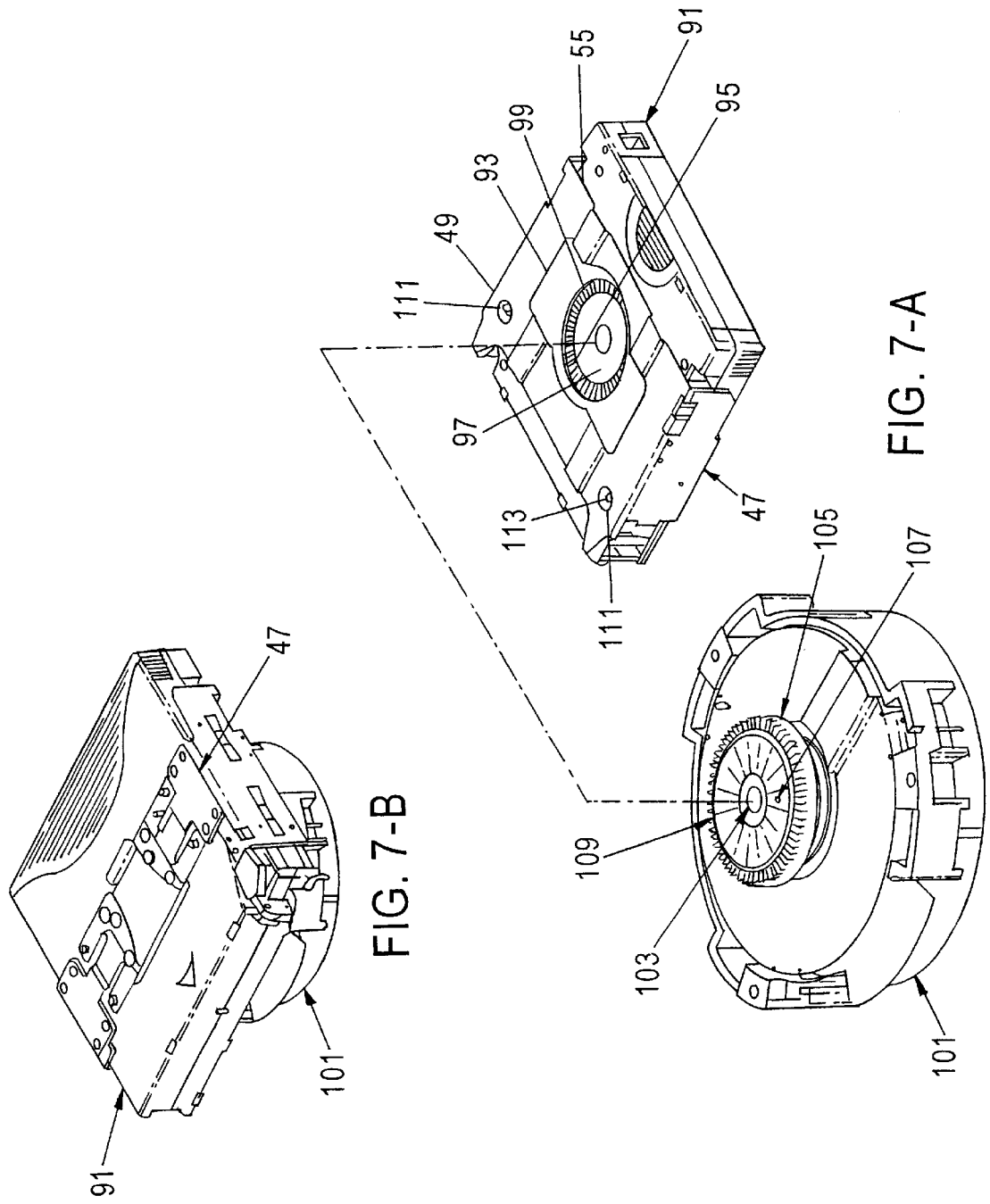

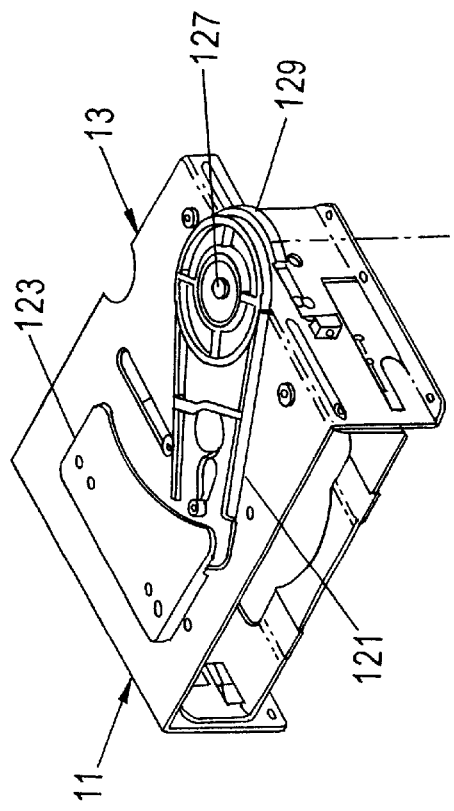
FIG. 8-A
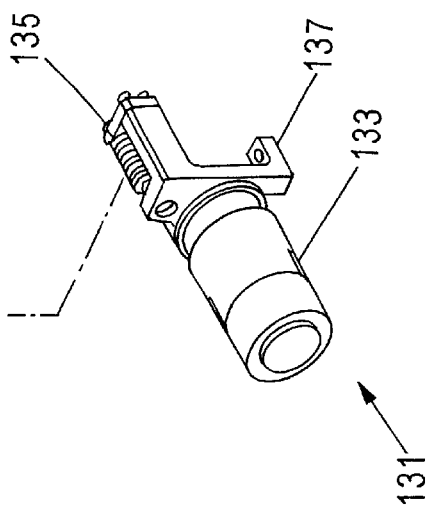
FIG. 8-C
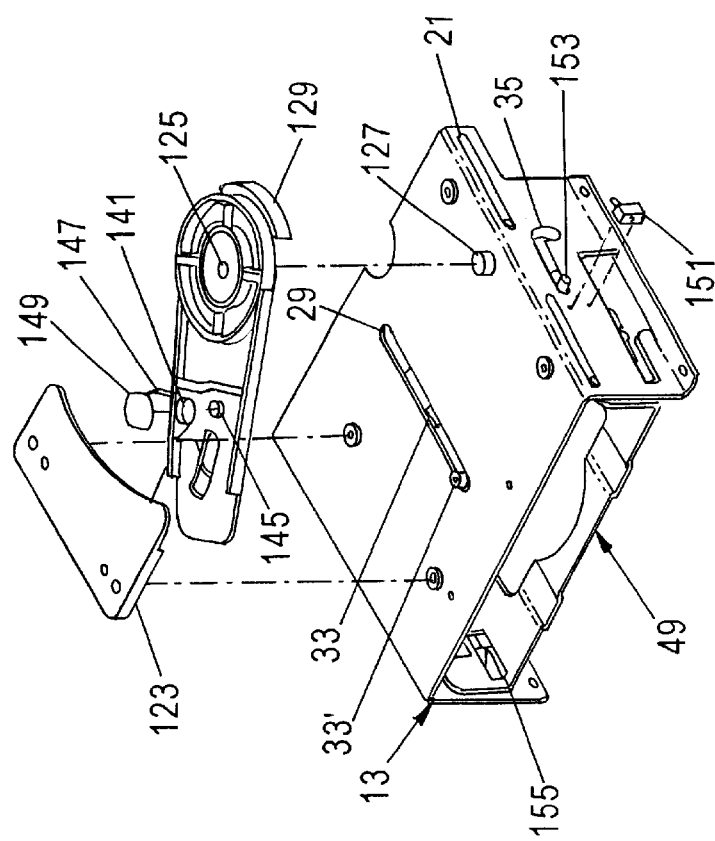
FIG. 8-B

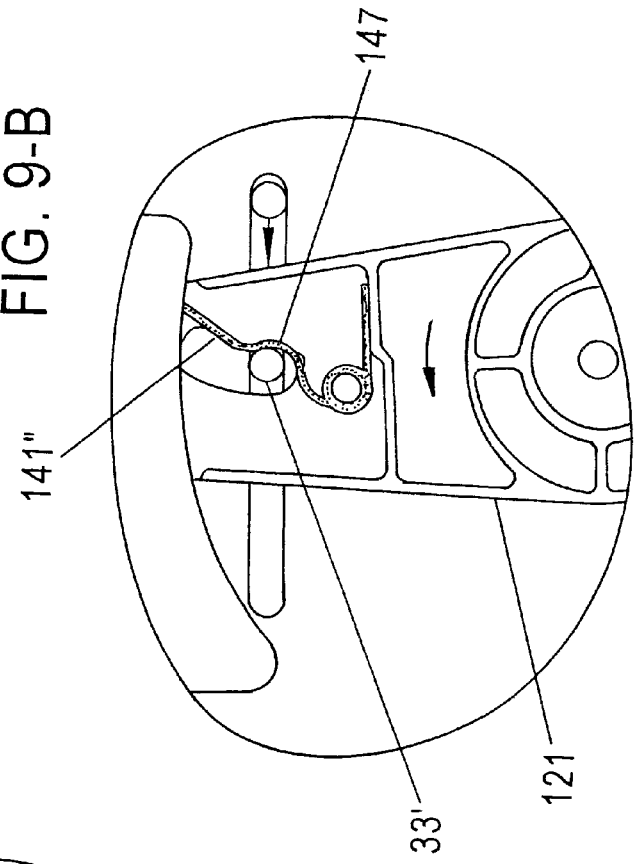
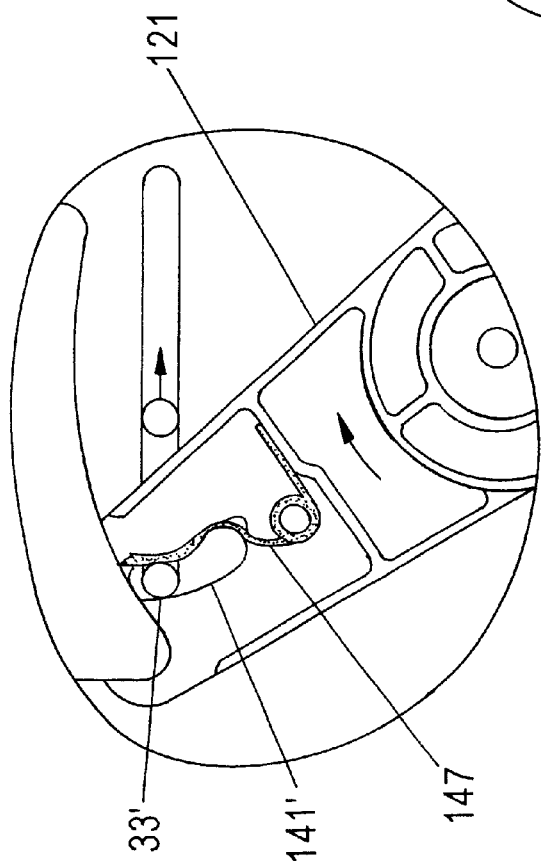

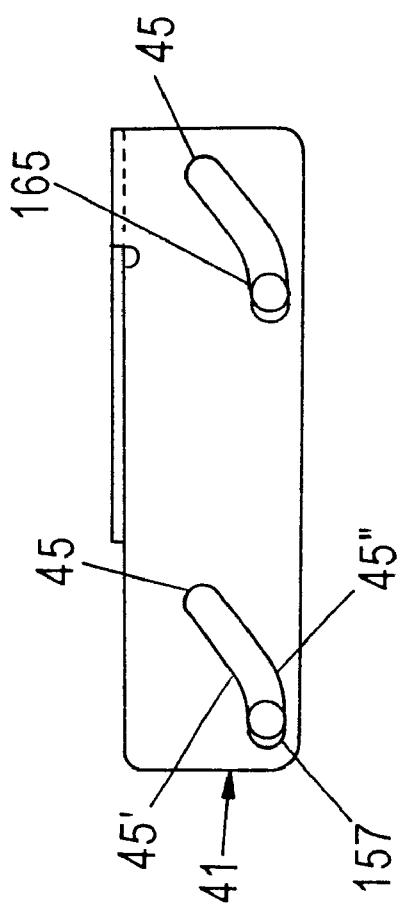
FIG. 10-A
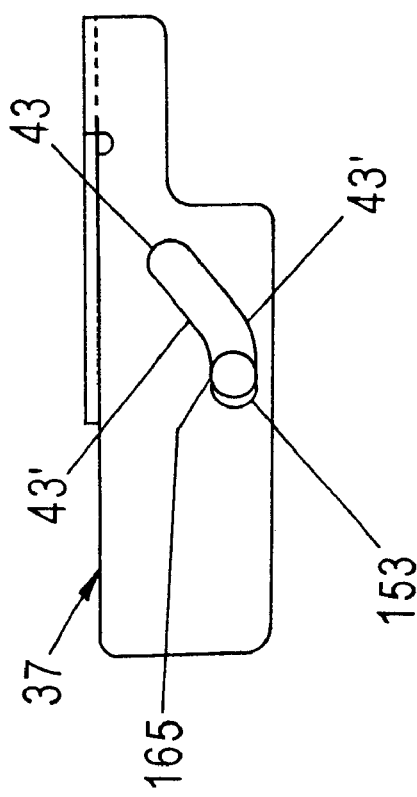
FIG. 10-B

TECHNIQUE FOR OPENING DOOR OF A TAPE CARTRIDGE TO ACCESS THE TAPE LEADER PIN

RELATED APPLICATIONS

This application claims the benefit of U.S. Provisional Application Ser. No. 60/136,700, entitled "An Effective Method of Opening the Cartridge Door to Access the Leader Pin in the Viper Tape Drive" filed on May 28, 1999, by William B. Kim, the disclosure of which is entirely incorporated herein by reference.

Attention also should be directed to the following commonly assigned applications by William B. Kim.

U.S. patent application Ser. No. 09/314,970 filed May 20, 1999 entitled "Tape Cartridge-Loading Mechanism;" and U.S. patent application Ser. No. 09/314,974 filed May 20, 1999 entitled "Techniques for Compensating for High Initial Unloading Force Requirement in Tape Cartridge-Loading Mechanism."

FIELD OF THE INVENTION

This invention relates to a technique for opening an access door of a data tape cartridge. The invention also relates to a loader mechanism incorporating the door opening device, for example, a mechanism for loading a single-reel magnetic tape cartridge into a tape drive, to enable reading data from and writing data to the tape.

BACKGROUND

Computers utilize a variety of magnetic media devices for the storage of software programs and data. Information recorded on the magnetic medium takes the form of flux transitions that represent the binary "1's" and "0's" that form the digital information. Tape cartridges, such as single-reel tape cartridges, are commonly used in library or other archival data storage applications. In such applications, a user or a robotic mechanism selects a tape cartridge for processing and inserts the cartridge into a tape drive coupled to a computer. In a fully automated system, a mechanism within the tape drive loads the tape from its entry point to a position in which the tape becomes accessible for read-from and write-to operations.

A variety of different size data tape cartridges are available. The drives for the different size cartridges, however, must be substantially the same size, so as to fit within a standard size slot or space available within the framework of a personal computer or the like. Larger cartridges enable storage of more data on the tape within, however, the larger the cartridge the more difficult it is to design a drive mechanism to fit within the design envelope.

A number of manufacturers have recently developed a new format based on a linear tape-open technology. This technology accommodates a range of storage requirements from single server to complex network environments, in both fast-access and high-capacity formats.

Of particular note, the high capacity tape format uses a single reel cartridge to maximize capacity, for example, for backup, restore, and archive applications. The high-capacity linear tape-open format uses a new data cartridge designed to maximize the amount of tape surface area while still enabling use of very small form factors. Present implementations of this cartridge contain 600 meters of half-inch tape and have a native storage capacity of 100 GB. The form factor for this tape cartridge is 105.4 mm wide, by 102 mm long by 21.5 mm high.

The drive mechanism for the linear tape-open high-capacity tape cartridge provides bi-directional tape motion during read/write and locate/rewind operations. The single-reel cartridge design uses a take-up reel located inside the drive. A coupler grabs a leader pin at the start of the tape and draws it out of the cartridge and around the tape head to the take-up reel in the drive. After the leader pin is secured in the take-up reel, the reel rotates and pulls the tape through the tape path. A gear built into the cartridge reel and a gear coupled to the drive reel motor form a clutch enabling the motor to drive the rotation of the tape reel within the cartridge.

A cartridge of the size used for the high-capacity for the linear tape-open format or a similarly sized competing cartridge product, by itself fills a substantial portion of the design envelope for the tape drive. In the past, tape drives for cartridges of such size have utilized manual loading mechanisms. All movement and operations to load the tape cartridge into the drive, open the tape door for access to the tape leader and engage the tape drive gear to the drive motor gear have been manual in nature. A portion of the cartridge remains outside the drive, even in the fully loaded position, to allow an operator to grip and remove the cartridge.

Data cartridge tape drives have been developed with automatic or "soft" loading and unloading of the cartridge. However, because of the size and complexity of the loading mechanisms, these automatic loaders have been used only in drives for smaller tape cartridges.

Also, automatic cartridge tape drives must be able to load and unload cartridges many times without jamming or other failures. A failure of an automatic loader mechanism may damage a tape cartridge, and it makes the drive unusable until repaired or replaced. Typical design parameters for drives available today call for the loader mechanism to continue to operate successfully for at least 300,000 loading/unloading cycles. For applications with frequent cartridge replacement, such as tape library systems providing access to volumes of data to many users via networks, to have a truly useful life each tape loader mechanism must operate successfully with little or no wear for many more cycles than even this design parameter.

It should, therefore, be appreciated that a need exists for an automatic loading mechanism for data tape cartridges that takes up the minimum amount of space within the design envelope of the tape drive, to allow the mechanism and the drive to handle as large a cartridge as possible. Also, a need exists for a loader mechanism of this type that is particularly durable and can operate successfully for a large number of loading/unloading cycles without any jams or other failures.

Most data tape cartridges in use today have an access door. The door normally is closed, to protect the tape media and any data stored thereon. The automatic loader for the tape drive therefore must include some mechanism that opens the access door during loading of the cartridge. A wide variety of different access-door opening mechanisms have been tried in the past. To a large extent, these mechanisms have reflected the particular structure and operation of the access door of the tape cartridge.

A number of available cartridge designs, including designs for single-reel cartridges, have used hinged doors. The opening mechanism for such a cartridge must swing the door open and into an unobtrusive position before the front of the tape cartridge gets too near the read/write head(s).

For example, U.S. Pat. No. 5,868,333 to Nayak discloses a single-reel tape cartridge design with a hinged access door, wherein the cartridge incorporates a cable and tab arrangement that serves as part of the door opening mechanism. A finger mounted in the tape drive engages the tab, to apply force through the cable to a reel around the pivot pin of the access door and pivot the door open, as the cartridge is inserted into the drive. This configuration does permit opening of the aperture door without the need for motors or electrical components.

U.S. Pat. No. 5,237,469 discloses a door opening mechanism for use in an automatic cartridge loader. This mechanism, however, utilizes a complex ratchet gear, pivot pin and lever arm arrangement. Such a mechanism requires a large number of parts, making it expensive. Because of the complexity, it would likely serve for only a relatively small number of operation cycles. Also, such a mechanism takes up considerable real estate within the design envelope of the drive.

U.S. Pat. No. 5,495,374 also discloses an automatic tape cartridge loader. This Patents suggests the use of a door opening mechanism that includes a pivotable arm with a pin that engages a slot in the tape access door. The arm pivots the tape access door at the forward end of the cartridge to open the door and expose a segment of the tape, as the cartridge is inserted into a carriage of the loader. After the door is open, the carriage assembly is automatically moved forward to carry the cartridge forward and engage the exposed segment of the tape in the cartridge with a head.

The automatic tape cartridge loader disclosed in U.S. Pat. No. 5,331,485 utilizes a spring loaded pivot member to engage and open the access door. As the cartridge support carriage moves inward, a stud follows an angled cam surface to allow the pivoting member to pivot under the force of a spring. The pivoting member includes a finger, which engages the rear extension of the access door as the pivoting member 138 pivots, to thereby push the access door open.

U.S. Pat. No. 5,543,993 discloses a door opening mechanism using a pin to engage a slot in a forward end of a pivotable door. The pin is mounted on the end of an elongate door opener frame. A door opener bearing and a pivot shaft pivotally mount a rearward end of the door opener frame and a rear end of the opener bearing to a frame of a loader mechanism adjacent a cartridge insertion slot.

The pivoting members disclosed in these three prior patents also are overly complex, making them expensive and susceptible to wear and damage. Also, these mechanisms take up too much space within the confines of the tape drive.

Many other examples of door opening mechanisms are known in the art.

Some of the prior door opening mechanisms are effective in general terms. However, few have proven effective in high volume storage applications, wherein the automatic loader incorporating the door opening mechanism must function flawlessly through a very large number of loading and unloading cycles, with little or no wear or failure and little or no wear or damage to the cartridge door. As shown by the above examples, many of the mechanisms, particularly those used in automatic loaders have been overly complex and required excessive space.

The tape cartridge for the high-capacity linear tape-open format utilizes a spring-loaded sliding door in one sidewall of the cartridge, near a front corner of the cartridge. A particular need exists for an effective mechanism to open such an access door that is adequately durable, does not adversely impact the tape cartridge or its door even in extended use and is sufficiently small to operate within the small space available in the design envelope for the drive. The door-opening mechanism itself should be quite durable and resistant to impact damage, to insure continued operation throughout a large number of cycles of the automatic loader mechanism.

SUMMARY OF THE INVENTION

The present invention meets the above-stated needs and overcomes the problems with prior cartridge loader systems.

Thus, one aspect of the invention relates to a loader for a tape cartridge. The loader includes an automatically moveable shuttle, for receiving the tape cartridge. The shuttle is arranged for movement so as to move the tape cartridge to and from a loaded position in engagement with a tape drive. The inventive loader also includes a door-opening element. This element is fixedly attached to the shuttle and occupies minimal space. This element opens a spring-loaded sliding access door on the tape cartridge in response to receipt of the cartridge in the shuttle.

Another aspect of the invention relates to an automatic tape cartridge loader, for loading an elongate, rectangular tape cartridge. The shell of the cartridge encloses a length of tape and has a pair of sides and a pair of ends. A sliding spring-loaded door in one side proximate one end of the shell provides access to a leader attached to an end of the tape. The loader includes a cartridge shuttle configured to receive the tape cartridge. The shuttle is mounted for automatic movement between a cartridge reception position and a position wherein the cartridge engages one or more operative elements of a tape drive for reading and writing of data on the length of tape. The automatic tape cartridge loader also includes a door-opening feature fixedly attached to a wall of the cartridge shuttle. The door-opening feature extends toward an interior of the cartridge shuttle. The position of the door-opening feature enables the feature to engage the sliding spring-loaded door of the cartridge shell and open the door, as the tape cartridge is inserted into the cartridge shuttle.

In the preferred embodiments, the door-opening feature is as an integral element of the wall bent inward from the wall, typically at an angle substantially perpendicular to the wall of the cartridge shuttle. The embodiments of the shuttle also include at least one cartridge-positioning feature mounted opposite the wall. The positioning feature justifies the cartridge toward the wall and the door-opening feature as the tape cartridge is inserted into the cartridge shuttle. The preferred embodiments of the cartridge-positioning feature comprise one or more extrusions projecting from a wall of the cartridge shuttle opposite the door-opening feature.

The preferred embodiment of the cartridge shuttle also includes at least one cartridge stop fixedly positioned on the cartridge shuttle to engage a forward end of the cartridge shell as the tape cartridge is inserted into the cartridge shuttle. The stop is positioned such that when the tape cartridge is inserted into the cartridge shuttle sufficiently to engage the cartridge stop, the door-opening feature has substantially fully opened the sliding spring-loaded door of the tape cartridge.

The preferred embodiments also include a number of unique elements for automatically actuating the shuttle motion. A loader embodying the inventive concepts typically includes a frame housing, and a conveyor is mounted for linear motion within the frame housing. The shuttle is mounted in the conveyor. The conveyor has opposing first and second sidewalls. In the preferred embodiments, the conveyor has a first cam profile in the first sidewall, and a second cam profile in the second sidewall, and the shuttle has attached cam follower bearings that engage the cam profiles of the conveyor.

To actuate a linear motion of the conveyor, the loader includes a rotatable actuator arm. The arm is substantially flat. The arm includes a groove at a distance from its axis of rotation. The groove edges serve as cam profiles, to drive a bearing attached to a conveyor, to move the conveyor along a linear path during loading and unloading operations. The groove edges are contoured to maintain substantially 90° contact with a circumference of the bearing, during each linear motion of the bearing and conveyor. The actuator also preferably includes an impact buffer spring, to bias the bearing within the groove.

Rotation of the actuator arm produces the linear motion of the conveyor within the frame housing. The cam profiles on the conveyor sidewalls are angled such that interaction through the cam follower bearings produces a two-dimensional movement of the shuttle.

The preferred embodiment of the shuttle includes cantilevered springs for applying spring force toward the tape drive motor to the cartridge within the shuttle. These springs also buffer the cartridge within the shuttle. The cam profiles induce motion of the shuttle slightly past the cartridge-loaded position, to produce a gap between a surface of the cartridge and an adjacent surface of the shuttle. The cantilevered springs buffer the cartridge within the shuttle, when the shuttle moves past the cartridge-loaded position. A portion of the cantilevered spring assembly also serves as a guide, to guide the front of the cartridge into the space within the shuttle as it first enters the loader.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The drawing figures depict the present invention by way of example, not by way of limitations.

FIG. 2 is an isometric view of a tape cartridge and selected portions of the tape drive shown in FIG. 1, useful in explaining operation of the present invention.

FIG. 3 illustrates a tape cartridge when fully inserted into the cartridge shuttle, which incorporates the inventive door-opening feature.

FIGS. 4-A to 4-D are different views of a first embodiment of the cartridge shuttle incorporating the inventive door-opening feature as well as the extruded features for justifying the tape toward the door-opening feature and the cartridge stops.

The other drawings provide detailed illustrations of components of a preferred embodiment of a tape cartridge loader, as described more below.

FIG. 5-A is an isometric view of the loader assembly frame housing.

FIG. 5-B is an exploded isometric view of the loader assembly housing and the conveyor showing the interconnection thereof.

FIG. 6-A is an isometric view of the assembly formed by the cartridge shuttle and the cantilevered spring assembly, from the back.

FIG. 6-B is an exploded isometric view of the assembly formed by the cartridge shuttle and the cantilevered spring assembly from the front (cartridge loading) side.

FIG. 7-A is a side isometric view, illustrating the interacting elements of the cartridge and the cartridge shuttle, with the shuttle and cartridge inverted to show the lower side thereof.

FIG. 7-B is a backside isometric view showing the cartridge and the cartridge shuttle in the loaded position on top of the reel motor.

FIG. 8-A is an isometric view of the loader assembly with the shuttle conveyor actuator, from the front (cartridge loading) side.

FIG. 8-B is an exploded isometric view of the loader assembly and the shuttle conveyor actuator from the front (cartridge loading) side.

FIG. 8-C is an isometric view of the cartridge loading motor and worm gear assembly.

FIG. 9-A is a detailed view of the cam follower, the cam profile and the impact buffer spring of the shuttle conveyor actuator, at the start of cartridge loading.

FIG. 9-B is a detailed view of the cam follower, the cam profile and the impact buffer spring of the shuttle conveyor actuator, at the start of cartridge unloading.

FIG. 10-A is a detailed view of the two cam profiles of the left sidewall of the conveyor and the cam followers of the cartridge shuttle riding within those profiles.

FIG. 10-B is a detailed view of the cam profile of the right sidewall of the conveyor and the cam follower of the cartridge shuttle riding within that profile.

Figure 11:
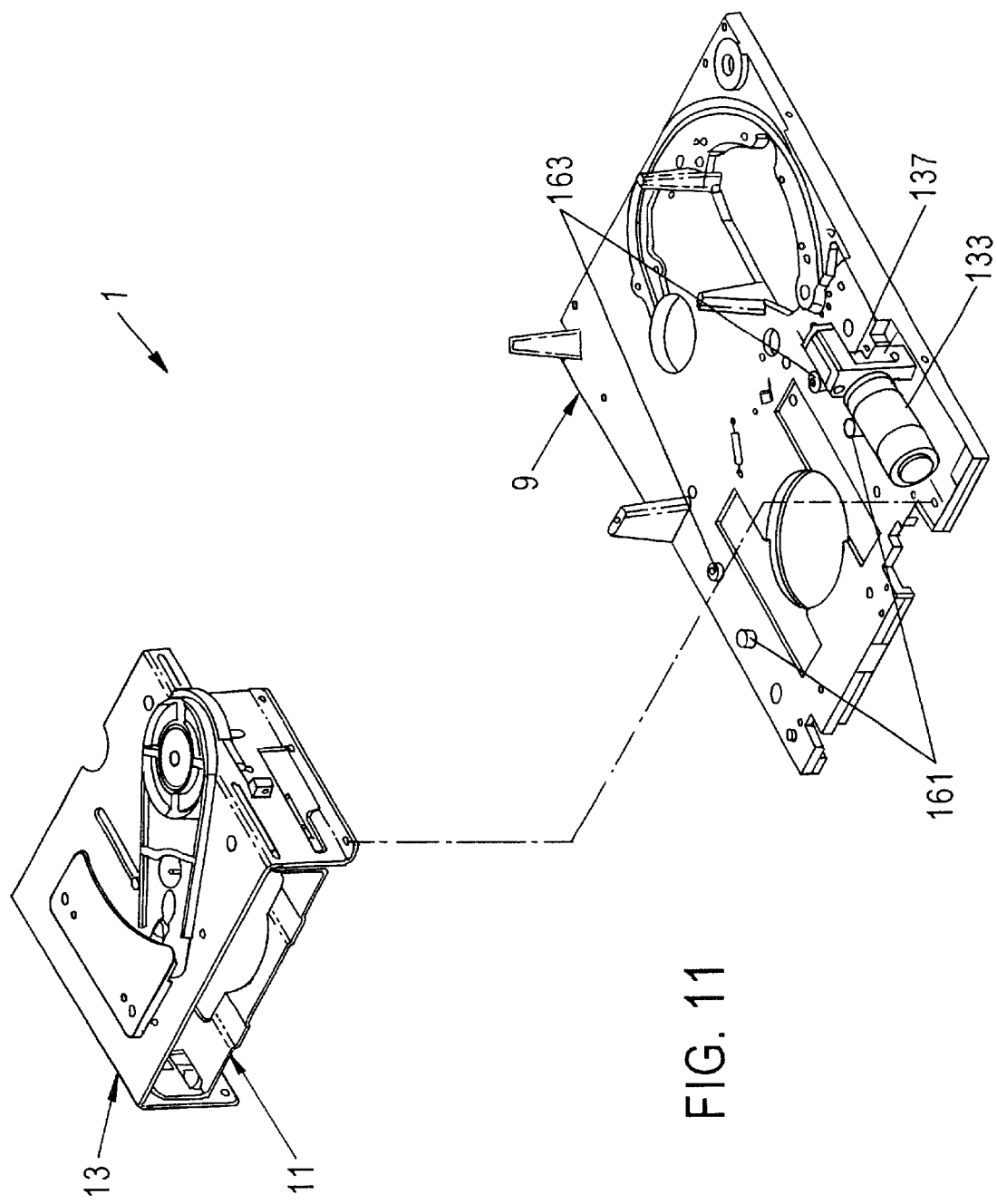

FIG. 11 is a partially exploded isometric view of the shuttle assembly, the cartridge loader motor and the tape drive base.

DESCRIPTION OF THE PREFERRED EMBODIMENTS

Figure 1:
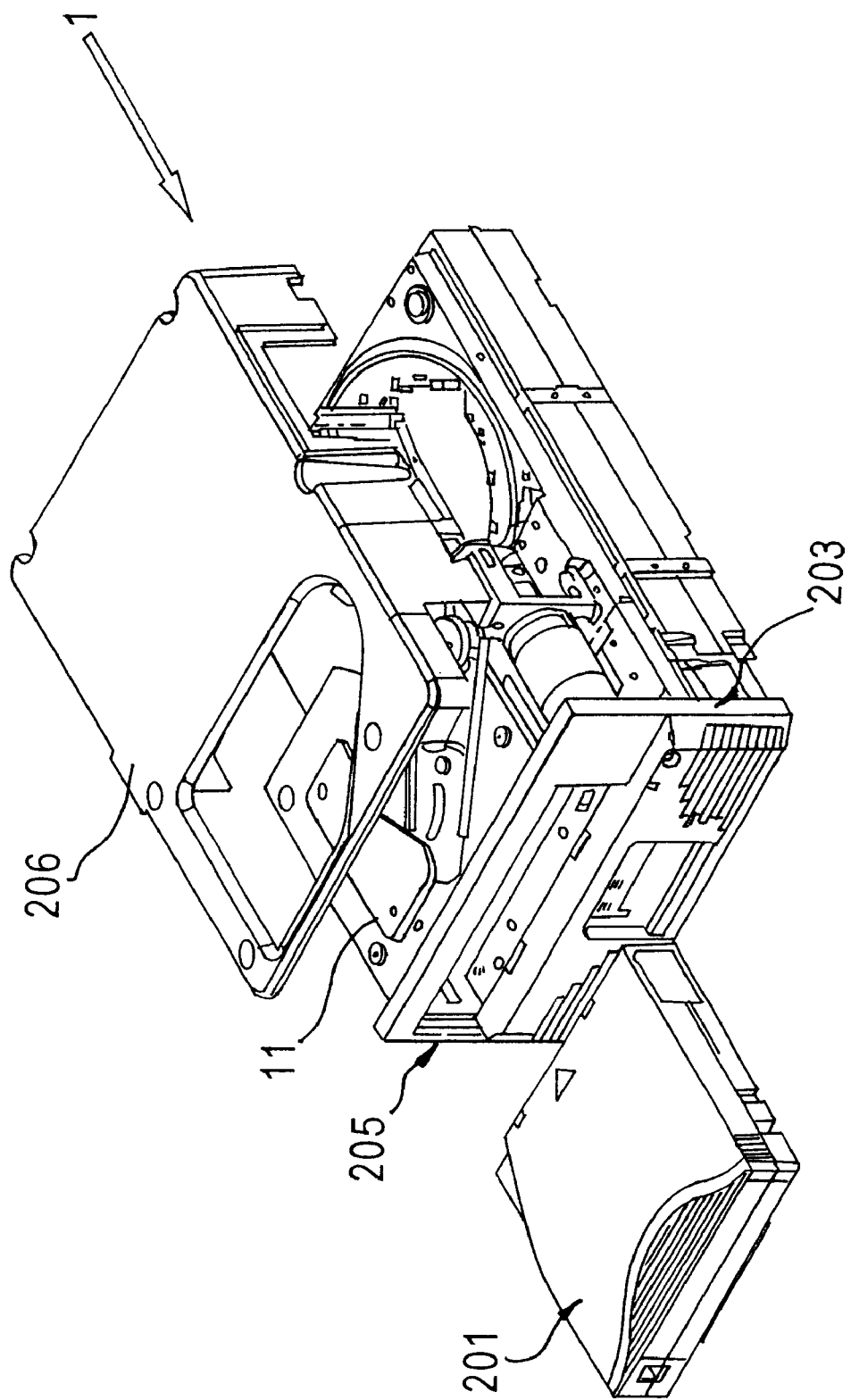
FIG. 1 is an isometric view of a tape cartridge and a tape drive, which incorporates a loader mechanism embodying the present invention.

FIG. 1 shows a tape drive 1 and a tape cartridge 201 ready for insertion into the drive. The tape drive 1 includes a loader mechanism 11, discussed in more detail below with regard to a specific embodiment thereof (FIGS. 5-A to 11). The loader mechanism 11 incorporates a tape cartridge shuttle having a bent feature to open a tape access door of the cartridge in accord with the invention.

As shown in FIG. 1, the tape drive 1 includes an associated bezel 203. The mechanical and electrical elements of the tape drive 1 would be mounted within the main housing of a computer, such as a personal computer, server or main frame; and the bezel 203 covers the front area of the tape drive. The bezel 203 includes an opening 205, through which a cartridge such as 201 is inserted into the loader 11 of the tape drive 1. Although not shown, the opening 205 may have a hinged door.

In operation, an operator or a mechanical device will insert the tape cartridge 201 through the opening 205. As the cartridge 201 travels into the cartridge shuttle within the drive 1, a passive feature incorporated into a wall of the shuttle engages a sliding door on the side of the cartridge. The feature retracts and opens the door as the front of the cartridge passes by the feature. When the cartridge 201 is fully inserted into the loader mechanism 11, that mechanism operates to automatically retract and lower the cartridge until a gear on the tape reel engages a drive gear. A grabbing feature extracts a leader pin, to draw tape from the cartridge and wind the tape onto a take-up reel within the drive 1. The wheel and the reel are rotated back and forth, to pass the tape over one or more magnetic heads, to enable writing data to and reading from the tape.

To unload the cartridge, the loader mechanism 11 is automatically operated to raise the cartridge and move the cartridge back to the front of the drive 1. The loader mechanism 11 moves the cartridge sufficiently to cause a rear portion thereof to extend out through the bezel opening 205, to enable the operator or automatic handling mechanism to grip and remove the tape cartridge 201. The withdrawal of the cartridge 201 disengages the door-opening feature, allowing the spring within the cartridge to push the access door closed.

FIG. 2 shows the tape cartridge 201, the bezel 203 and the cartridge shuttle 207, with other elements of the drive removed, to facilitate illustration of the door-opening function and related features. As shown, the cartridge 201 includes an elongate, rectangular tape cartridge shell having a pair of sides, a pair of ends, a top and a bottom. The cartridge encloses a length of tape. In the preferred embodiment, the cartridge 201 is an high-capacity linear tape-open type tape cartridge, which encloses 600 meters of tape. When viewed from the top or bottom, the cartridge shell is approximately square, being only slightly wider (side-to-side) than it is long (front-to-back). In the orientation shown, the right side of the cartridge shell includes a sliding spring-loaded door 202 proximate the right edge of the front of the cartridge shell. The door 202 provides access to a leader attached to an end of the tape.

An operator or an automatic mechanism moves the cartridge 201 in the direction I shown by the arrows, to move the front of the cartridge through the opening 205 in the bezel 203. For ease of illustration, FIG. 2 shows the shuttle somewhat further back from the bezel 203, than would actually be the case in a fully assembled drive 1 and loader mechanism 11. As the cartridge passes through the opening 205 in the bezel 203, the front end enters the cartridge shuttle 207. In the preferred embodiment, the shuttle is formed of a bent and extruded sheet metal, to substantially encircle both sides and the bottom of the cartridge 201. One sidewall of the shuttle 207 includes at least one and preferably two extruded features 209. The features 209 project from that sidewall inward and toward the opposite wall of the shuttle 207.

The other sidewall of the cartridge shuttle 207 includes a bent feature 211, along the back edge of the sidewall. The sidewall has an appropriate length so as to position the feature 211 to engage the door 202 and enable substantially full retraction of the door 202 as the cartridge 201 is moved fully within the shuttle 207. The extruded features 209 push the cartridge 201 to the right, and thus toward the wall with the door-opening feature 211, as the cartridge enters and passes into the cartridge shuttle 207. In this manner, the features 209 ensure operative engagement of the bent door-opening feature 211 with the door 202 on the cartridge 201 during insertion.

The distal end of the bottom plate of the shuttle 207 also includes two bent features 213. The features 213 extend upward. The features 213 form stops limiting the motion of the cartridge 201 into the cartridge shuttle 207. The positional relationship of the feature 211 and the stops 213 is such that when the cartridge reaches the stops (fully inserted into the shuttle) the feature 211 has retracted the spring-loaded tape access door 202 into the shell of the cartridge 201, to substantially fully open the door.

When the cartridge 201 is fully inserted into the shuttle 207, and the front thereof engages the stops 213, the loader mechanism 11 operates automatically to retract the cartridge in the H direction shown and lower the cartridge in the V direction shown. At the end of this compound loading motion, the mechanism brings the tape and its supporting reel within the cartridge 201 into operative engagement with various components of the drive 1.

FIG. 3 shows a cartridge 201 fully inserted into a shuttle 207. FIG. 3 also shows a spring and guide assembly 217 attached across the top of the cartridge shuttle 207, as discussed in more detail later with regard to a preferred embodiment.

FIG. 3 shows the bent feature 211 engaging the access door. In this arrangement, with the cartridge 201 fully inserted to engage the stops at the end of the shuttle 207, the feature 211 has retracted the sliding door within the cartridge 201. The door is retracted at least enough to provide an adequate access opening, and preferably the feature 211 has substantially fully retracted the access door. With the door retracted, the cartridge now has an access opening 204 exposing a leader pin 219, attached to an end of the data tape. The access opening 204 is sufficiently large to enable a grabbing feature within the drive to engage the pin 219 and withdraw the tape from the cartridge 201.

The isometric view of FIG. 4-A and the top, front and side views of FIGS. 4-B, 4-C and 4-D provide more detailed illustrations of the structure of the shuttle 207, the extruded justifying features 209, the door-opening feature 211, and the stops 213. As can be seen in FIGS. 3 and 4-A, the bottom plate of the shuttle 207 includes an opening 215. As discussed in more detail later, the opening 215 provides access to a gear attached to the bottom of the tape reel within the cartridge.

The illustrated shuttle 207 comprises an integral unit having a bottom plate and opposing sidewalls. The extruded features 209 are integral elements of one sidewall. The door-opening feature 211 is essentially an integral extension of the other sidewall that has been bent inward. Similarly, the stops 213 are essentially integral extensions of the bottom plate that have been bent upward. All of these fixed features 209, 211 and 213 on the shuttle are passive elements, in that they require no moving parts (relative to the shuttle) and no mechanical or electrical actuation. All of these passive features rely instead on the movement of the cartridge into the shuttle. Because of the integral formation of the door-opening feature and the positioning features on the opposite wall, the shuttle itself effectively opens the access door on the cartridge. There is no need for any other mechanism that might otherwise take-up valuable space within the volume of the tape drive.

The other drawings depict a preferred embodiment of the loader mechanism 11, in somewhat more detail. The reference numerals in those drawings refer to elements of the preferred embodiment and may differ somewhat from those used in the more general disclosure of the mechanism provided by FIGS. 1 to 4-D, to facilitate the more detailed description thereof The preferred embodiment of the tape drive 1, includes a base 9 and a loader assembly 11 (see e.g. FIGS. 5-B and 11). The loader assembly 11 receives a tape cartridge, for example containing a magnetic tape or other tape media for storage of digital data. In the presently preferred embodiments, the cartridge is a single-reel tape cartridge containing magnetic tape, such as the high-capacity tape cartridge for the linear tape open technology. The loader assembly 11 loads the cartridge into engagement with a drive motor and opens a door on the cartridge to provide access to a pin and leader attached to the tape contained within the cartridge, in essentially the manner described above, A load arm assembly, not shown, connects to the leader and withdraws the leader for coupling to a take up reel. While so engaged, the tape from the cartridge may be repeatedly wound and rewound between the cartridge and the take up reel, while data is read from and/or written to the magnetic tape.

The tape drive 1 may be loaded manually, or the tape drive may receive a cartridge from another mechanism, for example from a robotic tape selector in a tape library system. For ease of description, the text below refers to insertion of a tape by a user. Those skilled in the art will recognize that this "user" may be a human operator or an automated device or system for selecting one of many available tapes, for example in a library of such tapes, and inserting the selected tape through a bezel opening into the tape drive.

The tape drive 1 may be orientated in any convenient direction. For purposes of discussion, it is assumed that the opening for insertion of the tape cartridge corresponds to the "front" of the drive, and the width of the opening to receive the cartridge would be horizontal. The user would insert the cartridge with a front-to-back motion. In several of the drawings, such as 5-B and 11, the base 9 and/or the loader assembly 11 of the drive 1 are shown in a position to receive the cartridge from the front, and the loader assembly 11 retracts and lowers the cartridge during loading, to engage the tape within the drive. For convenience of discussion, references to horizontal, vertical, various sides and front and back will assume such a normal orientation of the drive 1, and where appropriate to a corresponding orientation of the cartridge, as shown in those drawings. The orientations shown and the descriptive references thereto, however, are for purposes of illustration and example only.

The tape drive 1 includes a base 9 and a loader assembly 11 (FIG. 11). The loader assembly 11 comprises a frame housing 13 (FIGS. 5-A, 5-B). If the base 9 is horizontal, as shown in FIG. 11, the loader assembly frame housing 13 is secured to the top side of the base 9, for example by rivets or the like. As discussed more later, the loader assembly 11 includes a unique actuator system, designed for durability yet occupying minimal space within the design envelope for the loader. The actuator system includes a cam profile and follower arrangement and/or one or more springs specifically configured to assist in separating the cartridge from the drive motor during an unloading operation.

With reference to FIG. 5-A, the loader assembly frame housing 13 comprises a right sidewall 15, a planar top plate 17 and a left sidewall 19. The sidewalls 15, 19 are substantially perpendicular to the top plate 17. The right sidewall 15 includes a horizontal shoulder at the bottom with two or more holes therethrough, to facilitate attachment of the sidewall to the top of the base (FIG. 11). The left sidewall includes two or more horizontal holes therethrough, to facilitate attachment to the side of the base.

Each sidewall 15, 19 of the loader assembly frame housing 13 includes two linear travel grooves 21. In the illustrated embodiment, the grooves 21 are adjacent to the top of the respective sidewall and extend parallel to the top plate 17. The conveyor includes a cam follower bearing for interaction with each of the linear travel grooves. In the illustrated implementation, these follower bearings comprise machine screws or pins and bearings mounted for rotation about the pins. A pin 23 passes through a bearing 25 and is attached to a hole in the matching sidewall of the conveyor 27. The bearings 25 are slightly smaller in diameter than the vertical height of the linear travel grooves 21. The linear grooves 21 and the associated cam follower bearings 25 provide vertical support for the conveyor 27. Each of the bearings 25 travels along one of the linear grooves 21, to provide a precise front-to-back linear travel for the conveyor 27.

The top plate 17 of the loader assembly frame housing 13 includes another linear travel groove 29. In the illustrated embodiment, the groove 29 is substantially centered in the top plate 17 between the two sidewalls 15, 19. The groove 29 is somewhat longer than the individual grooves 21. The conveyor 27 includes two cam follower bearings for interaction with the top linear travel groove 29, for example formed by pins 31 and bearings 33. A pin 31 passes through a bearing 33 and is attached to a hole in the matching top plate of the conveyor 27. The bearings 33 are slightly smaller in diameter than the width of the linear travel groove 29. The bearings 33 travel along the linear groove 29 in the top plate 17, to limit lateral movement of the conveyor during front-to-back linear travel of the conveyor 27.

As shown, the front pin 31' actually is somewhat taller than the back pin 31, and the pin 31' passes through two bearings 33, 33'. The lower bearing 33 engages the linear travel groove 29, for control of the front to back motion of the conveyor 27. As discussed more later, the upper bearing 33' forms a cam follower bearing engaging a cam profile within an actuator arm, which induces the movement of the conveyor 27. The back pin 31 and the bearing 33 form a path guide bearing.

The sidewall 15 of the frame 13 includes a path constraint groove 35. The groove 35 includes a first linear section extending horizontally (parallel to the top plate 17) in the front-to-back direction along the sidewall. A second linear section, at the back of the groove, extends vertically downward.

The conveyor 27 comprises a right sidewall 37, a top plate 39 and a left sidewall 41. The sidewalls 37, 41 are substantially perpendicular to and extend vertically downward from the top plate 39. The sidewalls of the conveyor 27 include inclined cam profiles 43, 45. Specifically, the right sidewall 37 includes one inclined cam profile 43, approximately mid-way from front to back along the wall, for raising and lowering the cartridge shuttle (shown in other drawings). The left sidewall 41 includes two cam profiles 45, for use in raising the left side of the cartridge shuttle.

The linear grooves 21, 29 and associated cam follower bearings coupled to the conveyor 27 enable front-to-back linear motion of the conveyor within the loader assembly frame housing 13. In a preferred embodiment, the conveyor moves 31.4 mm horizontally. The inclined cam surfaces 43, 45 in the sidewalls 37, 41 of the conveyor 27 produce a vertical movement of the cartridge shuttle assembly together with and in response to the horizontal movement of the conveyor. The cam follower bearing engaging the inclined cam profile 43 also engages the path constraint groove 35 in sidewall 15. The groove 35 controls the direction and extent of travel of the cartridge shuttle during loading and unloading operations.

FIG. 6-A and 6-B illustrate the structure of the cartridge shuttle assembly 47, used in the preferred embodiment. FIG. 6-A is an isometric view from the back of the assembly, whereas FIG. 6-B is an isometric view from the front of the assembly. The cartridge shuttle assembly 47 is generally similar to that shown carrying the inserted cartridge in FIG. 3. The assembly 47 essentially comprises two elements, the cartridge shuttle 49 (similar to the shuttle 207) and a flat spring and guide assembly 51 (similar to the guide and spring assembly 217).

The cartridge shuttle 49 comprises a right sidewall 53, a planar bottom plate 55 and a left sidewall 57. The sidewalls 53, 57 are substantially perpendicular to and extend vertically upward from the bottom plate 55. As shown in FIG. 6-B, the left sidewall 57 of the cartridge shuttle 47 includes two extruded features 59, which extend toward the center of the shuttle assembly 47. The features 59 essentially correspond to the features 209 in the earlier embodiment.

As the user inserts a tape cartridge into the shuttle 47, the extruded features 59 engage the left side of the tape cartridge and push the cartridge toward the right side of the cartridge shuttle assembly 47. Essentially, the features 59 serve to justify the cartridge to the right, and thus toward the door-opening feature, during loading of the cartridge into the drive. The features 59 maintain the cartridge in the justified position throughout loading, data read/write operations and unloading of the tape from the tape drive. The justification by the features 59 ensures engagement of a door-opening feature with an edge or lip of the tape access door on the cartridge, as discussed later.

The back end of the bottom plate 55 includes two extensions near the left and right edges of the plate. These extensions include vertical projections 61, which serve as cartridge stops, essentially similar to the stops 213 in the earlier embodiment. When the user inserts the cartridge, the user pushes the cartridge from front-to-back inside the tape cartridge shuttle assembly 47. The projections or stops 61 limit the travel of the cartridge from front-to-back into the tape cartridge shuttle assembly 47.

Each sidewall 53, 57 connects to an attachment plate 63, 65 bent back at right angles to the sidewalls toward the top-center section of the shuttle assembly 47. Each of the attachment plates includes four holes for receiving rivets 66, to secure the flat spring assembly 51 to the cartridge shuttle 49.

The attachment plate 65 extends somewhat more to the rear of the assembly 47 (FIG. 6-B), to allow attachment of a sensor switch support 67 (FIG. 6-A). The sensor switch support 67 in turn supports a cartridge-in sensor switch 69 with a flexible cable guide 71 for the electrical cable connection to the switch. When the user inserts the cartridge, the user pushes the cartridge from front-to-back inside the assembly 47 until the cartridge engages the stops 61. As the cartridge approaches the stops 61, it also actuates the sensor switch 69. The switch 69 provides a signal to the drive control circuitry (not shown) indicating insertion of a cartridge and triggering actuation of the loader motor assembly, as discussed more later.

The right sidewall 53 includes the door-opening feature, in this embodiment a bent feature 73 extending inwards from the back edge of the wall. The feature 73 is positioned along the wall 53 and extends inward an appropriate distance, so as to engage a front lip or edge of the sliding access door on the right side of the tape cartridge. In the preferred embodiment, the feature 73 is an integral element of the sidewall 53. The integral feature 71 is bent inward at an appropriate angle, for example approximately 90° with respect to the sidewall 53. If the shuttle is a sheet metal component, the feature 73 would be stamped out with the sidewall 53 and bent inward as desired, during the manufacturing process.

The feature 73 on the shuttle 49 corresponds to the door-opening feature 211, discussed above with regard to FIGS. 2 to 4D. As the cartridge enters the shuttle 49 and travels to the back thereof, the features 59 justify the tape cartridge toward the right sidewall 53 and the door-opening feature 73. As the front of the cartridge passes the feature 73, the feature engages the front edge of the access door. The feature 73 engages and pulls the tape access door of the cartridge toward the rear of the cartridge, as the cartridge continues to move past the feature 73. This opens the tape access door of the cartridge, and enables access to the tape leader pin by a load arm assembly (not shown). When the front end of the cartridge engages the stops 61, the feature 73 will have retracted the door at least enough to provide access to the leader pin and tape and preferably has substantially fully opened the door.

Near the lower front corner, each sidewall 53, 57 includes a rectangular opening 74, which extends somewhat into the bottom plate 55. The openings 74 enable mounting of flat springs and extension of the springs into the interior of the cartridge shuttle assembly 47. The springs (one of which appears in a later drawing) engage notches in the tape cartridge.

Consider now the flat spring assembly 51. As noted, this assembly 51 is mounted across the top of the cartridge shuttle 49. The spring assembly 51 includes a front tip 75 for vertically guiding the cartridge as the user inserts the cartridge through the bezel opening into the tape drive. The assembly 51 includes a roughly H-shaped plate 77 for actual attachment of the spring assembly 51 to the plates 63, 65 associated with the sidewalls of the cartridge shuttle 49 by the rivets 66. The plate 77 in turn supports four cantilevered flat springs 79. Two of the springs 79 extend to the right of the assembly 51, along the front and the back of the assembly (FIG. 6-B). The other two springs 79 extend to the left of the assembly 51, along the front and the back of the assembly. Each spring 79 includes a cartridge pressure button 81 extending down through the distal end of the spring. The buttons 81 contact the top surface of a cartridge when contained within the cartridge shuttle assembly 47. The buttons 81 transfer spring pressure downwards from the cantilevered flat springs 79 to the cartridge, to assist in engaging the tape reel of the cartridge with the tape chuck of the drive motor and to buffer the cartridge vertically within the shuttle, as discussed more below.

The cartridge shuttle assembly 47 together with the conveyor 27 receive the tape cartridge, and they enable horizontal and vertical motion from the receiving position where the cartridge passes through the bezel opening into the tape drive to the cartridge-loaded position where the tape reel engages the drive motor chuck and the actual tape may be withdrawn from the cartridge for data read/write operations. To facilitate this motion, the sidewalls 53, 57 include attachment holes 83, for attachment of cam follower bearings to the assembly 47. As visible in the front isometric view of FIG. 6-B, the right sidewall 53 includes a single attachment hole 83 approximately mid-way along the sidewall, for attachment of a cam follower bearing to engage the cam profile 43 of the right sidewall 37 of the conveyor 27 as well as the path constraint groove 35 in the right sidewall 15 of the frame housing 13. As visible in the rear isometric view of FIG. 6-A, the left sidewall 57 includes two attachment holes 83. These two holes enable attachment to the cartridge shuttle 49 of cam follower bearings to engage the inclined cam profiles 45 of the left sidewall 41 of the conveyor 27.

FIG. 7A shows a tape cartridge 91 inserted in the cartridge shuttle assembly 47. In this drawing, the tape cartridge and the shuttle assembly are turned upside down, to show the underside thereof. As shown, the bottom plate 55 of the cartridge shuttle 49 includes an opening 93. The opening 93 extends laterally across the central portion of the bottom plate and provides access to the bottom of the cartridge 91, specifically to the central drive gear 95 of the tape cartridge. The drive gear 95 is coupled to the bottom of the tape spool within the cartridge 91. The drive gear 95 comprises a metal or magnetic plate 97 around the coupling to the central shaft and downwardly extending gear teeth 99 around the periphery of the gear. The material of the plate 97 is such as to enable attraction of the cartridge drive gear to a magnet within the motor gear.

FIG. 7A also depicts the tape drive motor 101. As shown, the motor includes a vertical drive shaft 103, driven to rotate by the electromagnetic components of the motor. A motor drive gear 105 is secured to the upper end of the drive shaft 103. The motor drive gear 105 includes a ring-shaped magnet 107 about the end of the shaft 103 and a ring of upwardly extending gear teeth 109 around the periphery of the gear. The size of the teeth 109 and the diameter of the ring of teeth 109 correspond to those of the gear teeth 99 on the cartridge drive gear 95, to enable the two sets of teeth to mesh when the cartridge is in its loaded position.

The magnet 107 on the motor drive gear 105 interacts with the plate 97 of the cartridge gear 95, as the shuttle assembly 47 lowers the cartridge 91 to the position shown in FIG. 7-B, to provide a magnetic clutch action. The magnetic force between the magnet 107 and the plate 97 pulls the cartridge gear 95 toward the motor drive gear 95 to provide a positive mesh between the two sets of peripheral gear teeth 99, 109.

FIG. 7-A shows two additional openings 111 near the back corners of the bottom plate 55 of the cartridge shuttle 49. When a cartridge 91 is fully inserted into the shuttle assembly 47, as shown, the openings 111 provide access to small holes 113 formed in the bottom of the cartridge 91. These holes are used for registration with features on the base plate, as the loader assembly lowers the cartridge into its full, operational position, as discussed more later with regard to FIG. 11.

Observers will also note that, when the cartridge 91 is fully inserted into the shuttle assembly 47, the access door is substantially fully open as shown in FIG. 7-A.

FIGS. 8-A to 8-C illustrate the elements of the automatic actuator assembly, for producing the linear back and forth movements of the conveyor. FIG. 8-A depicts the loader assembly 11 with the shuttle conveyor actuator arm 121 and the actuator guide 123 mounted on the top of the frame housing 13. The actuator arm 121 includes a bearing opening 125 (FIG. 8-B). The bearing opening 125 is sized slightly larger than the pivot pin 127, securely attached to the top of the frame housing 13 (FIG. 8-B). The pivot pin 127 and opening 125 form a bearing enabling rotational motion of the arm 121 about the axis of the pin and opening. Surrounding regions of the arm include raised bosses, to insure adequate strength and rigidity.

The actuator arm 121 is a relatively flat member extending from the pivot axis across the top of the frame housing 13. The flat construction of this arm minimizes the vertical space occupied by the means for actuating the conveyor in response to the motive force of the loader motor assembly.

The portion of the periphery around the end of the arm 121 centered about the axis of the pin and opening is semicircular. Along a portion of the semicircular end of the arm 121, the arm includes a series of sector gear teeth 129, offset or stepped-down below the plane of the actuator arm. The sector gear teeth extend out radially, to edges that are substantially vertical.

FIG. 8-C presents an isometric view of the loader motor assembly 131. The assembly 131 includes an electromagnetic motor 133, a gear reduction box, an encoder, a gear train and a worm gear 135. The assembly also includes a bracket 137 for securely attaching the assembly 131 to the base (see FIG. 11). The teeth of the worm gear 135 essentially form a screw, which rotates about a horizontal axis. The motor 133, gear reduction box, and gear train drive the worm gear 135 to rotate about its axis. The gear 135 may rotate clockwise or counterclockwise about its axis, depending upon the drive signals applied to the motor 133, to drive the various operations of the loader assembly 11.

When assembled, the teeth of the worm gear 135 of the motor assembly 131 engage the sector gear teeth 129 on the periphery of the end of the actuator arm 121. The motor assembly 131 rotates the worm gear 135, and the interaction between the teeth of the gear 135 and the teeth of the gear 129 causes the actuator arm 121 to rotate about the pivot axis formed by the pin 127 and the opening 125. Rotation of the worm gear 135 in a first direction will cause the actuator arm 121 to rotate about its axis in a clockwise direction (when viewed from the top as in FIG. 8-A). For example, during a loading operation, this drive operation would move the actuator arm from the position shown in FIG. 8-A to a position around to the right. Later rotation of the worm gear 135 in a second direction will cause the actuator arm 121 to rotate about its axis in a counterclockwise direction to drive the actuator arm back to the position shown in FIG. 8-A, to unload a cartridge.

The actuator guide 123 is mounted on the top plate of the frame housing 13. The front and back ends of the guide 123 include bosses, to support the guide at a distance above the top plate 17 of the housing frame 13. A leading edge of the actuator guide 123 extends to the right, above the path of travel of the distal or radial end of the actuator arm 121. Effectively, the radial end of the actuator arm 121 adjacent the groove 141 travels in the space between the top plate of the frame housing 13 and the guide plate 123. The guide 123 limits any possible upward movement of that end of the arm 121, to prevent twisting of the arm during its movement to load and unload cartridges from the tape drive 1.

The top surface of the guide 123 is the actual top of the loader mechanism. The actuator arm 121 and the guide 123 provide a particularly low profile and make efficient use of space within the design envelope for the drive.

As shown by the discussion above, the drive motor assembly 131 drives the actuator arm 121 to rotate. The conveyor 27, however, moves in a linear direction along the front-to-back axis of the loader assembly 11. To convert the rotation of the actuator arm 121 to a linear motion for driving the conveyor 27, the arm 121 includes a curved groove 141. The front and back edges of the groove 141 form cam profiles for cartridge loading and unloading. The groove is wider than the diameter of the associated cam follower bearing, so that when the bearing follows one edge or profile of the groove there is a gap between the bearing and the opposite edge of the groove.

FIG. 8-B shows the cam follower bearing 33' attached to the conveyor, for interaction with the edges of the groove 141. The lower bearing 33 on the front pin and the back bearing 33 interact with the linear travel groove 29, as discussed above relative to FIG. 5-B. The camming action of the edges of the groove 141 moves the follower bearing 33' back and forth in a linear fashion along the groove 29 in the top plate 17 of the frame housing 13. This motion of the follower bearing 33' in turn induces linear movements of the conveyor 27.

The actuator arm 121 includes a pivot 145, projecting upwards from the upper surface of the arm near one end of the groove 141. The actuator arm 121 also supports a torsion spring 147, which serves as an impact buffer. The coil of the impact buffer spring 147 fits around the outside of the pivot 145. A retainer 149 attaches to the pivot 145 to hold the spring 147 in place. The retainer is a flat member threaded on the bottom for attachment to matching threads of the pivot 145. The retainer has flat sides to enable a technician to turn the retainer to attach or detach it from the pivot. This design of the retainer minimizes the height thereof, to keep the loader mechanism within height constraints for the design profile of the drive.

In the preferred embodiments, the bottom, the left and right sides, and the back of the drive 1 are enclosed by a housing (see FIG. 1). Because of the small height allowed for the drive, the housing does not cover the arm 121 and the guide 123 on the top of the loader.

FIGS. 8-A and 8-B also show the interaction of the home position sensor switch 151 with the cam follower bearing 153 attached to the shuttle. Specifically, the frame housing 13 supports an attached micro-switch 151 near the front end of the horizontal section of the path constraint groove 35 (FIG. 8-B). The home position sensor switch 151 provides a control signal to stop the loader motor operation when it detects the cam follower 153 attached to the shuttle approaching the front end of the groove 35, at the end of an unloading operation.

In FIG. 8-B, one of the two flat springs 155 is visible through the sidewall opening 74 (FIG. 6-B). The springs 155 register with notches in the lower side edges of the tape cartridge housing, when the tape is fully inserted into the shuttle assembly.

FIGS. 9-A and 9-B show the interaction of the groove 141, the cam follower bearing 33' and the spring 147 in somewhat more detail. The spring 147 comprises two arms extending outward from the coil about the spring pivot. One arm engages a boss formed on the top of the actuator arm and remains relatively stationary with regard to the arm and the pivot. The other arm extends from the coil outward essentially along the radial dimension of the arm 121. The coil of the spring 147 is dimensioned such that the spring applies a counterclockwise force. This force normally biases the follower bearing 33', and thus the conveyor 27 back toward the bezel opening. The spring 147 serves as an impact buffer, to absorb at least some of the force if any imparted to the conveyor by insertion of a tape cartridge through the opening into the drive.

The contour of the arm of the spring is carefully designed as shown to maintain direct contact with the bearing 33' as the bearing moves along the cam profile edges of the groove. As shown in FIG. 9-A, the spring 147 normally biases the cam follower bearing 33' forward against the cam profile formed by the front edge 141' of the groove. This front edge 141' serves as the cam profile during clockwise rotation of the actuator arm 121 to load a tape cartridge into the drive. The cam profile 141' pushes the follower bearing 33'. Specifically, as the arm 121 rotates from the position shown in FIG. 9-A, the follower bearing 33' engages the edge 141' and moves to the right as shown by the arrow. The force on the follower bearing during the loading operation is controlled by the cam profile of the edge 141'. As the bearing 33' follows the profile edge 141', the bearing 33' also engages and moves inward along the contour of the moveable arm of the spring 147. The serpentine contour of the edge 141' is carefully designed so that as the arm 121 rotates clockwise the edge 141' maintains a constant 90° contact and pressure with respect to the circumferential surface of the follower bearing 33'. The arm of the spring 147 maintains similar 90° contact with the follower bearing 33'.

FIG. 9-B illustrates engagement of the follower bearing 143 with the back edge 141" of the groove, during movement of the actuator arm 121 to unload the tape cartridge from the drive. Both the cam profile 141" and the spring 147 push the follower bearing 33' during unloading. As the arm 121 rotates counterclockwise, to the left from the position shown in FIG. 9-B, the follower bearing 33' engages the edge 141" and moves back to the left as shown by the arrow. The cam profile of the edge 141" and the tension of spring 147 control the force on the follower bearing during the unloading operation. As the bearing 33' follows the profile edge 141", the bearing 33' also engages and moves outward along the contour of the moveable arm of the spring 147. The profiles of the edge 141" and of the arm of the spring 147 are designed to push the circumference of the follower bearing 33' with a 90° force angle, throughout the counterclockwise movement of the actuator arm. When the actuator arm 121 stops moving counterclockwise (position shown in FIG. 9-A), the force of the spring 147 returns the follower bearing 33' to the position where it engages the front edge 141' of the groove, for the next subsequent cartridge loading operation.

Hence, the operation of the loading motor assembly 131 causes the actuator arm 121 to rotate, and the cam profiles of the groove 141 move the follower 33' and the attached conveyor 27 back and forth along a linear path during loading and unloading operations. The direct perpendicular (90°) engagement of the cam profiles and the spring arm to the cam follower bearing maximizes the force transferred from the actuator arm to the conveyor. The tape cartridge shuttle is supported by follower bearings in cam profile grooves in the conveyor. The cam profiles together with the path constraint groove in the frame housing serve to convert the linear movement of the conveyor into a right angle movement of the shuttle and the cartridge within the shuttle. For example, during the loading operation, this right angle movement moves the shuttle and cartridge back into the drive and down into the operational position.

FIGS. 10-A and 10-B depict the cam follower and profile arrangement that couples the shuttle to the conveyor, including the cam profiles 43, 45 formed within the sidewalls 37, 41 of the conveyor 27 and the associated follower bearings. Both drawings depict the cam profiles as if viewed from the right side. Each cam profile comprises an angled groove, with a short section having a low-pressure angle, a bend and a somewhat longer inclined section with a higher angle of pressure. In each case, the upper edge 43' or 45' of the groove serves as the cam profile engaging the corresponding cam follower bearing during loading of a tape cartridge. The lower edge 43" or 45" of the groove serves as the cam profile engaging the corresponding cam follower bearing during unloading of a tape cartridge.

The two grooves 45 forming the cam profiles in the left sidewall (FIG. 10-A) have the same dimensions, specifically to facilitate a camming action with a 4 mm diameter cam follower bearing 157. The groove 43 forming the cam profile in the right sidewall (FIG. 106-B) has a similar contour, but this groove is wider so as to interact with a 5 mm-diameter cam follower bearing 153.

The contour of the right side conveyor wall 37 includes a notch enabling access through the tape door of the cartridge. Consequently, the wall 37 only has room for one groove 43.

To carry the requisite load, the bearing 153 is larger than the bearings 157. To accommodate the larger bearing, the groove 43 is larger than the grooves 45. As a result, the edges 43', 43" present somewhat different cam profiles than do the edges 45', 45".

As the actuator arm moves the conveyor back into the frame housing during a loading operation, the frame sidewalls 37, 41 move from left to right in the orientation shown in the views of FIGS. 10-A, 10-B. Initially, the path constraint groove 35 causes the cam follower bearing 153 on the shuttle to move laterally. However, when the follower bearing 153 reaches the end of the horizontal section of the groove 35, the follower bearing 153 can begin to move downward, and the upper edge 43' of the cam groove 43 in the conveyor sidewall 37 becomes an effective cam profile. Similarly, the upper edges 45' of the grooves 45 become effective cam profiles driving the follower bearing 157. As the actuator arm continues to move the conveyor 27 toward the back of the tape drive, the cam profiles 43', 45' drive the follower bearings 153, 157 attached to the cartridge shuttle 49 downward. The path constraint groove 35 now limits the movement of the shuttle to a direct vertical drop, and the shuttle lowers the tape cartridge into its loaded position on top of the tape drive motor. As the shuttle reaches the end of its linear travel, the cam profiles 43', 45' push the follower bearings 153, 157 to positions essentially as shown in FIGS. 10-A and 10-B.

The three loading cam profiles formed by the grooves 43, 45 shown in FIGS. 10-A and 10-B lower the cartridge relatively evenly, to a position of flat engagement of the drive gear within the cartridge to the drive gear on the motor. However, because of the different dimensions of the cam follower bearings 153, 157 and the attendant different contours of the back edges 43", 45" of the grooves, the cam action during unloading is different on each side of the cartridge shuttle. Specifically, as the actuator arm 121 moves the conveyor 27 back toward the front of the drive (right to left in FIGS. 10-A, 10-B), the trailing edges 45" of the smaller grooves 45 in the left sidewall 41 engage the smaller diameter follower bearings 157 first. As such, the left wall of the conveyor 27 applies an upward force to the left side of the shuttle 49 before any upward force is applied to the right side of the shuttle. This produces a torque or twist on the cartridge 91, and the plane of the plate is not lifted in parallel to the plane of the magnet, so as to help separate the plate in the cartridge drive gear from the magnet in the motor drive gear. As the conveyor motion continues, the trailing edge 43" of the larger groove 43 in the right sidewall 37 engages the larger diameter follower bearing 153 to lift the right side of the shuttle. Further movement of the conveyor lifts the shuttle and cartridge along the path defined by the path constraint groove 35. Still further movement of the conveyor then moves the shuttle and cartridge laterally back toward the bezel opening as constrained by the groove 35, to complete the unloading operation.

FIG. 11 shows the base 9 and the loader assembly 11 of the tape drive 1 in an exploded view. This view also illustrates two aspects of the invention incorporated into the base 9.

First, the base 9 includes two load balancing springs 161. These springs engage the bottom surface of the tape cartridge shuttle, when the shuttle and cartridge are lowered into the fully loaded position. The lowering of the shuttle compresses the load balancing springs 161. The compressed springs apply an upward force to the shuttle. When the actuator begins to raise the shuttle, the spring forces assist in raising the shuttle and separating the plate in the cartridge drive gear from the magnet in the motor drive gear.

The springs 161 also create a force opposing lowering of the shuttle and cartridge into the final position. The cam profiles 43', 45' for loading include small regions 165 (FIGS. 10-A, 10B) to overcome this force. Specifically, each of these cam profiles includes a region 165 that extends adjacent the bend. Each region 165 has a low-pressure angle. These regions of the cam profiles apply forces to the cam followers to overcome the highest reaction from the springs 161 after the magnetic attraction ends during lowering of the cartridge, e.g. after the metal plate engages the magnet. The camming by the regions 165 also overcomes pressure forces of the cantilevered springs 79 to separate the bottom plate of the shuttle from the lower surface of the cartridge.

FIG. 11 also shows two features extending upward from the base 9. Preferably, these extruded features 163 are substantially conical, with narrower ends upward. The features are located on the base to engage the holes 113 formed in the bottom of the cartridge 91 (FIG. 7-A). Registration of the conical features in the holes 113 serves to accurately align the tape cartridge in its lowermost position.

It may be helpful to consider the sequence of operations involved in loading a tape cartridge 91 into the tape drive 1. Initially, the loader mechanism is idle awaiting insertion of a tape cartridge. Within the loader mechanism, the shuttle and conveyor are at the top and forward positions, for reception of a cartridge. A user or an automated mechanism inserts the tape cartridge through a bezel opening (FIG. 1 or FIG. 2) into the tape drive 1. Specifically, the cartridge 91 is inserted between the guide 75 and the plate 55 and pushed to the back of the cartridge shuttle 49. The extruded features 59 in left sidewall 57 of shuttle 49 push the cartridge to the right side of the shuttle 49. As the cartridge 91 is forwarded into the shuttle 49, bent feature 73 extending inwards from the back of the right sidewall 53 engages the tape-protecting access door and slides the door toward the rear of the cartridge, against the pressure of the door-spring within the cartridge. In this manner, the feature 73 opens the access door, exposing a leader pin attached to the end of the recording tape, making the pin accessible to a grabbing feature in the load arm assembly.

As the cartridge is pushed into the shuttle 49 and approaches its proper location, the flat springs 155 apply pressure and eventually the flat springs 155 engage notches in the lower edges of the cartridge. The front of the cartridge 91 also engages the stops 61. The cantilevered springs 79 apply downward pressure on the cartridge. The cartridge is now in a stable position for transport. The insertion of the cartridge also engages the cartridge in sensor switch 69, which triggers the loader motor assembly 131.

The motor 133, gear reduction box, and gear train drive the worm gear 135 to rotate about its horizontal axis, and the worm gear 135 engages the teeth of the gear 129 to rotate the actuator arm 121 clockwise about the vertical pivot axis formed by the pin 127 and the opening 125 (see FIG. 8-A) As the actuator arm 121 rotates, the front edge 141' of groove 141 makes normal contact (90° pressure angle) with the follower bearing 33' attached to the top of the cartridge conveyor 27 (FIG. 9-A). The rotational movement of the arm 121 therefore produces a linear movement of the conveyor 27 back into the tape drive 1.

The linear motion of the conveyor 27 initially induces a linear motion of the tape cartridge shuttle assembly 47 along the path constraint groove 35 in the frame housing 13. However, after the cam follower bearing 153 attached to the tape cartridge shuttle 49 reaches the end of the horizontal portion of the groove 35, the inclined cam profiles 43', 45' formed in the side plates of the conveyor induce a downward vertical movement of the tape cartridge shuttle assembly 47.

As the shuttle lowers the cartridge, the conical features 163 on the base 9 (FIG. 11) engage the holes 113 in the bottom of the cartridge (FIG. 7-A), to accurately align the tape cartridge in its lowermost position. Also, the ring-shaped magnet 107 of the motor drive gear 105 exerts a magnetic attraction force on the metal plate 97 in the central drive gear 95 of the tape cartridge, to pull the teeth 99, 109 of these two gears into a positive mesh. The cantilevered springs 79 also provide downward pressure to help position the cartridge in full engagement with the motor and base, and those springs provide some vertical buffering of the cartridge in the fully engaged position with respect to the cartridge shuttle assembly 47.

The regions 165 of the cam profiles apply the final pressure on the shuttle to offset the upward forces created by the springs 161 and the cantilevered spring 79. The regions 165 apply sufficient force to continue movement of the shuttle 49, even after engagement of the gears and after the cartridge comes to rest. This continued downward motion of the shuttle achieves a small separation (e.g. 0.3 mm) between the lower plate 55 of the shuttle 49 and the bottom of the cartridge. The regions 165 have a low pressure angle and may be slightly curved, to achieve a high force for a short throw or travel of the conveyor 27 relative to the cam followers 153, 156 and the shuttle 49. The high force is needed to overcome the sum of the various spring forces.

After this lowering of the shuttle and the cartridge, the loader motor assembly 131 stops, and the movement of the actuator arm 121, the conveyor 27 and the shuttle assembly 47 stops. The tape cartridge is in the fully loaded position. The leader pin attached to the end of the magnetic tape within the cartridge is accessible through the open tape door. A grabbing feature of the load arm assembly (not shown) grabs the leader pin and draws the pin to the center of the take-up reel (also not shown). The data read/write process may now commence.

It also may be helpful to consider the sequence of operations involved in unloading a tape cartridge from the tape drive 1. A control signal causes the tape drive motor 101 to rewind the tape into the cartridge, and the leader pin is released from the take-up reel and the load arm assembly. A control signal is then applied to the loader motor assembly 111. This signal causes the motor 133, gear reduction box, and gear train drive the worm gear 135 to rotate in the opposite direction about its horizontal axis.

The magnetic attraction between the metal plate 97 and the magnet 107 creates a force opposing the initial lifting of the cartridge 91. This places a high torque requirement on the loader motor. The invention provides two different mechanisms to help offset this torque requirement. First, the compression springs 161 produce a force tending to separate the cartridge from the drive motor and thus to separate the plate 97 and the magnet 107 within the gears 99, 109. Second, the unloading cam profiles 43, 45 and the associated cam follower bearings 153, 157 are designed to twist the cartridge somewhat during initial lifting, so that the two planes of the plate 97 and the magnet 107 are not parallel, and thus are easier to separate.

Continuing with the discussion of the unloading operation, the worm gear 135 engages the teeth of the gear 129 to now rotate the actuator arm 121 counterclockwise about the vertical pivot axis formed by the pin 127 and the opening 125 (FIG. 8-A). As the actuator arm 121 rotates, the back edge 141" of groove 141 makes normal contact (90° pressure angle) with the follower bearing 33' attached to the top of the cartridge conveyor 27 (FIG. 8-B). This rotational movement of the arm 121 therefore produces a linear movement of the conveyor 27 from the back of the tape drive 1 toward the front of the drive.

The forward linear motion of the conveyor 27 causes the trailing edges 45" of the smaller grooves 45 in the left sidewall 41 to engage the smaller diameter follower bearings 157 first (FIG. 10-A). This produces an upward force on the left side of the shuttle assembly 47 and the tape cartridge, causing a torque on the cartridge, to help separate the metal plate 97 in the cartridge drive gear 95 from the magnet 107 in the motor drive gear 105. To further assist in separation of the gears and overcoming the magnetic attraction, the two compression springs 161 on the base 9 apply upward forces to the bottom of the shuttle 49. As the linear movement of the conveyor 27 continues, the trailing edge 43" of the larger groove 43 in the right sidewall 37 engages the larger diameter follower bearing 153 to lift the right side of the shuttle 49 (FIG. 10-B). Further movement of the conveyor 27 lifts the shuttle 49 and the cartridge 91 along the path defined by the path constraint groove 3.5. Still further movement of the conveyor then moves the shuttle and cartridge laterally back toward the bezel opening as constrained by the groove 35. When the conveyor 27 and the shuttle assembly reach the end of their range of travel toward the front of the drive, the cam follower 153 trips the home position switch 151, and operation of the motor 133 stops.

At this point, the motion of the actuator arm, the conveyor 27 and the shuttle assembly 47 stop, and the cartridge is accessible through the bezel opening so as to allow a user or a mechanism to withdraw the cartridge. A user or robotic mechanism grasps a portion of the tape cartridge shell near the rear and pulls the cartridge out of the drive 1. As the cartridge 91 passes back out of the shuttle assembly 47, the front of the cartridge moves back past the door-opening feature 79. This removes the engagement of the feature with the door, and the spring within the cartridge slides the access door to the closed position.

As shown by the drawings and the above discussion, the automatic tape cartridge loader mechanism of the present invention provides an effective system for loading and unloading cartridges, while minimizing the space occupied by the loader. The loader illustrated in the drawings is only slightly larger than the tape cartridge itself. In particular, the features used to align the cartridge within the shuttle and open the access door as the cartridge enters the shuttle are quite simple and small. The small size enables use in a very tight design envelope for a relatively large cartridge, such as the high-capacity cartridge for the linear tape-open technology. The simple components also are quite rugged in that they are resistant both to impact damage and wear from repeated loading and unloading of tape cartridges.

The inventive tape loader has proven to be quite durable and has a long service life. A loader mechanism in accord with the invention was designed for a useful life of at least 300,000 loading/unloading cycles. An actual test unit has completed over 1,500,000 cycles without jam or failure and has exhibited virtually no component wear.

The preferred embodiments described above represent the best modes currently envisioned for the invention. However, the loader mechanism may be modified, while still maintaining the inventive concepts. For example, the cartridge positioning features could alternatively take the form of buttons glued or otherwise attached to the surface of the sidewall of the shuttle. As another alternative, the shuttle could utilize some form of leaf spring as the cartridge positioning feature. Also, the bent features used for the stops and the door-opening features in the preferred embodiments may have a variety of different sizes, shapes and angles, particularly to conform to different types of tape cartridges. Further, those skilled in the art will recognize that one or more of the stops and the door-opening feature may comprise a passive element attached to the shuttle at the appropriate location, instead of the respective integral bent feature shown in the drawings.

Those skilled in the art will recognize that the present invention admits of a number of further modifications, within the spirit and scope of the inventive concepts. While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. An automatic tape cartridge loader, for loading a tape cartridge into a tape drive for reading and writing of data on a tape within the cartridge, the tape loader comprising:

a cartridge shuttle configured to receive the tape cartridge and mounted for movement between a cartridge reception position and an operative position wherein the cartridge engages one or more operative elements of a tape drive for reading and writing of data on tape within the cartridge;

a loader motor;

an actuator assembly driven by the loader motor and coupled to the cartridge shuttle, to move the shuttle between the cartridge reception position and the operative position in response to drive force from the loader motor; and a door-opening feature fixedly attached to the cartridge shuttle and extending towards an interior of the cartridge shuttle, the door-opening feature being positioned on the cartridge shuttle so as to engage a sliding spring-loaded door of the cartridge and open the door as the cartridge is inserted into the cartridge shuttle to thereby provide access to a leader attached to an end of the tape for at least one of the operative elements of the tape drive, wherein the actuator assembly comprises:

a conveyor mounted for linear motion;

a cam profile and cam follower arrangement coupling the cartridge shuttle to the conveyor such that linear motion of the conveyor produces a two-dimensional movement of the cartridge shuttle between the cartridge reception position and the operative position; and a rotatable actuator arm coupled to the conveyor and driven to rotate by the loader motor, to produce linear motion of the conveyor in response to the drive force from the loader motor.

2. An automatic tape cartridge loader as in claim 1, wherein the cam profile and cam follower arrangement comprises:

at least one groove formed in each of two opposing walls of the conveyor at an angle with respect to the linear motion of the conveyor; and at least one cam follower bearing connected to each of two opposing walls of the cartridge shuttle, each cam follower bearing being arranged for engagement with a cam profile formed by an edge of a respective groove.

3. An automatic tape cartridge loader as in claim 1, wherein the actuator assembly further comprises:

a cam follower bearing attached to the conveyor and constrained for linear motion; and a groove through a distal portion of the actuator arm, one or more edges of the groove providing substantially perpendicular cam contact to the cam follower bearing during a rotational movement of the actuator arm so as to impart linear motion through the cam follower bearing to the conveyor during the rotational movement of the actuator arm.

* * * * *